United States Patent Office 3,262,158
Patented July 26, 1966

3,262,158
INJECTION OR PRESSURE FUSION MACHINE
Vinzenz von Reimer, Pickelstr. 13, Munich, Germany, and Quirino Gnutti, Ospitaletto, Brescia, Italy
Filed July 15, 1963, Ser. No. 295,144
Claims priority, application Germany, July 16, 1962, R 33,146; May 10, 1963, R 35,153
6 Claims. (Cl. 18—30)

It is well known at present that one of the main problems to be solved in connection with injection, pressure fusion machines or the like consists in the difficulty of producing a considerable pressure for closing the dies so as to prevent the injected mass from escaping therefrom.

To this purpose, the closing and the opening of the dies in conventional machines is effected by means of a two-stage operating means made up of a large-stroke device which provides for the opening and the closing displacements of said dies and of a minimum-stroke device which provides for the closing pressure. It has been found however that this means does not consent to realize a sufficient closing pressure, which furthermore should be kept at a constant value. This is due to the fact that the members utilized for transmitting the force exhibit, with respect to each other, a certain play or free gap, the amplitude of which varies as a function of the operation temperature. The length variations due to play in the bearings as well as to temperature variations are in reality quite small in their absolute value, but they have a great importance if compared with the extremely small stroke of the closure device.

The stroke of the closure device varies according to the machine temperature and to the plays or free gaps between the several members, thereby leading to a closing pressure which is sometimes too large and often too small.

To eliminate this disadvantage, the operating device controlling the displacements of the die holder plates has, in accordance with the present invention, a compensation device inserted therein which eliminates the plays of the several stress transmitting members by compensating the same. Upon having compensated said plays, the actuation of the closing device will provide, at the end of the complete stroke, for the closing pressure. For achieving a constant and sufficiently large closing pressure it is furthermore necessary to employ a closing device which is capable of performing a constant stroke.

Said closing device may be constructed for instance by means of toggle joint levers. With respect to the hydraulic systems used up to now as closing devices the use of a toggle joint lever system offers the advantage that in this case it must not be dealt with a medium which, due to the presence of gas traces, is compressible.

The present invention relates to an injection or pressure fusion machine which may however be used for other purposes as well, comprising a stationary die holder plate carrying a portion of the die and a movable die holder plate carrying the remaining portion of the die, slidably mounted on guiding columns and adapted to be fixed in a position corresponding to the closed stamp or die as well as to be actuated by a set of control members operating the displacement for closing the die, whereby said set of operating members comprises a large stroke device providing for the opening and closing displacement of the die and a small-stroke device providing for the closing pressure, said machine being characterized in that said set of members operating the displacement of the movable plate comprises a mechanical compensation device which upon having fixed in position the movable die holder plate and prior to having actuated the small stroke closing device, eliminates the plays of the members transmitting the stress from the plate fixing the movable die holder to the stationary die holder plate, and furthermore in that the small stroke closing device is so constructed as to be capable of performing a well defined, adjustable and constant stroke.

In particular, the mechanical compensation device may be made up of wedges, screws or eccentrics.

The accompanying drawings show an embodiment of the machine according to the invention.

Figure 1:
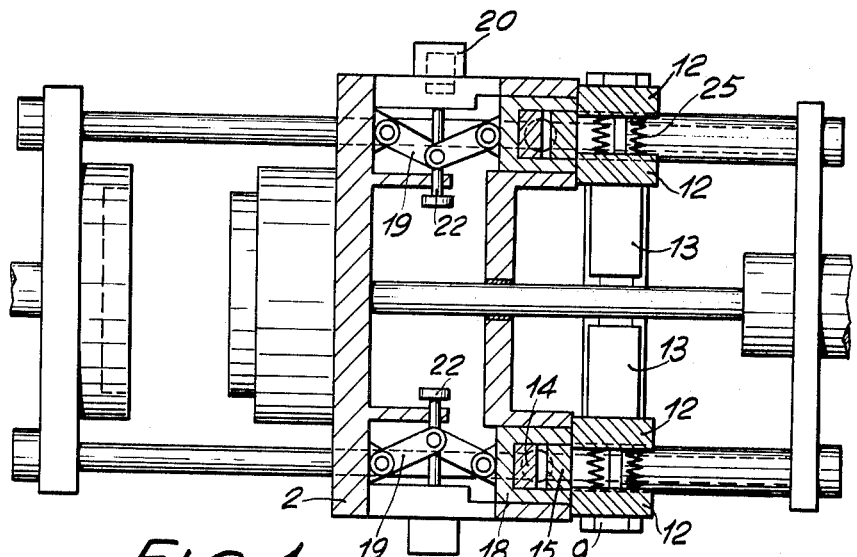
FIG. 1 is a partially sectional lateral view of a pressure fusion machine with open dies and having the set of operating members constructed according to the present invention; the sectioned portions correspond to line A–B of FIG. 2.

The injection machine shown in FIGURES 1–4 has a die holder plate 1 carrying the half die 5 and rigidly connected to the stationary counter plate 3 by means of the four columns 4. The columns 4 have the movable die holder plate 2–9 sliding thereon, said movable plate carrying the other half 6 of the die.

The stationary die holder plate 1 has the half die 5 mounted thereon and adapted to receive the material to be injected through a piston-cylinder or a screw 7. The movable die holder plate 2–9 has fixed thereto the other half die 6 which may be considered as the cover or the puller half die portion.

The movable die holder plate 2–9 may be blocked with respect to the four columns 4.

To this aim the movable die holder plate has applied thereto jaws 12 adapted to slide in a direction which is perpendicular to the four columns 4. These jaws may be compressed against said columns by means of a hydraulic unit 13 overcoming the counter force of the springs 25 also forming a part of the cross bars, whereby the jaws may grip the columns tightly engaging same in suitable grooves or catches. A spacer sleeve 8 resting against the stationary counter plate 3 is inserted in the position in which the movable die holder plate or a portion thereof is fixed to the columns. Lateral members applied to the jaws 12 in correspondence to the front portions of spacer sleeves 8 prevent the giving in of the movable die holder plate 2–9 which could cause the opening of the die 5–6.

The displacement of the movable die holder plate 2–9 is effected by an operating set comprising the following members: a hydraulic cylinder-piston system forming a hydraulic unit 21 and disposed in the stationary plate 3, the shaft of the piston resting against the movable die holder plate 2. This hydraulic unit is operative to effect the closing and opening stroke of the dies, this stroke occurring with a minimum stress and a large displacement.

The closing stress acting on the half dies 5 and 6 is applied by means of the toggle joint lever pairs 19 which are shown in FIG. 1 in their bent position and are actuated by the cylinders 20 to be brought into their extended position. The displacement thereby produced is exactly delimited since, each toggle joint lever pair, in its bent position, comes into contact with a stop 22 the position of which is suitably adjustable.

A compensating device 14–16 is provided according to the invention to make sure that, prior to the application of the closing stress, no play whatsoever be present in the parts transmitting the stress between the stationary die holder plate 1 and the fixing position of the movable die holder plate 2.

In the illustrated embodiment said compensating device is situated between the fixing position of the movable die holder plate 2 and the half die 6. To this scope the movable die holder plate is subdivided into two parts, namely the part 2 carrying the half die 6 and the part 9 separated from said first one and serving to effect the fixing. The two said parts are slidable with respect to each other guiding on pins 10 fixed to the die holder plate portion 2 and may be resiliently compressed together by means of springs 11. The die holder portion 2 has a slide 18 situated in correspondence thereto, slidable in the direction of the columns 4 and adapted to carry the compensating device 14–16.

In the illustrated embodiment the compensating device 14–16 consists of three wedges 14, 15 and 16 one of which, namely wedge 16, is inserted between the other two wedges by means of a control device which may be for instance hydraulically operating. The wedge 15 laterally rests against the fixing portion 9 or the jaws 12 which are fixed thereto in the direction of the columns 4 by means of dovetail guides. The wedge 14, on the contrary, rests with its free surface against the slide 18.

To ensure the reciprocal correct positioning of the wedges 14–16, the slide 18 is provided with a compression spring or similar element which may produce a corresponding stress. The toggle joint lever pairs 19 are applied with one end to the slides and with the other one to the movable die holder plate 2.

Figure 2:
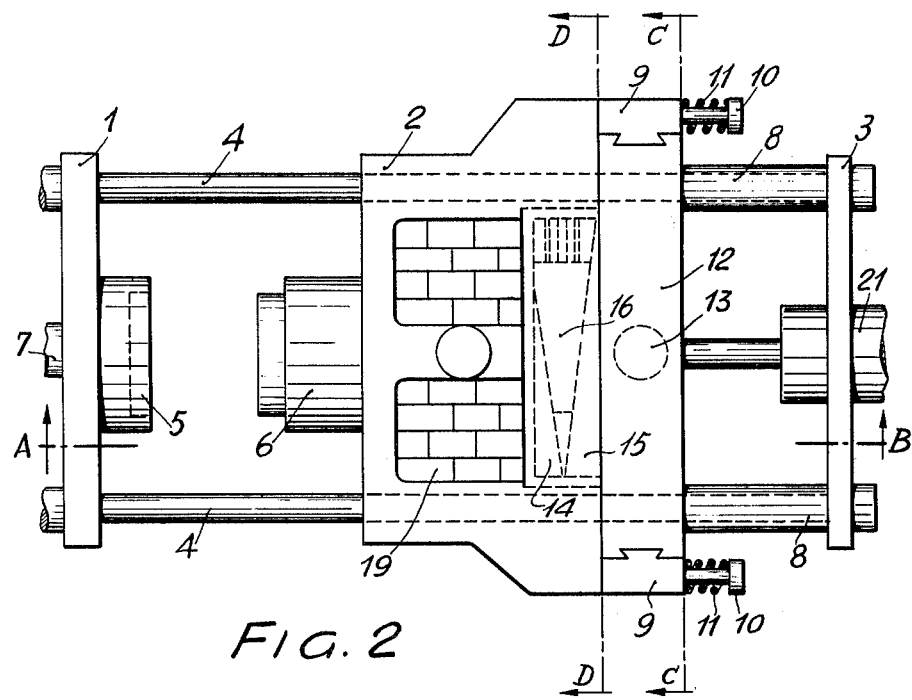
FIG. 2 is a plan view of the machine of FIG. 1.

The operation of the described machine takes place as follows:

When the die is to be closed, the operator acts on the die holder plate 2–9 by means of the cylinder-piston unit 21 displacing said plate to the left from the position shown in FIGS. 1 and 2 to the closure position, i.e. up to a position in which the half dies 5 and 6 are in reciprocal contact. The hydraulic control member 13 is thereafter actuated to close the jaws 12 so that the portion 9, serving for fixing the movable die holder plate in position, is rigidly connected to the columns 4. At this moment the play between the parts transmitting the stress is eliminated by means of the control member 17 acting on the wedge 16 to insert same between the two wedges 15 and 14. Upon having eliminated every play, the toggle joint lever pairs 19 are actuated by means of the control members 20 to bring them from the illustrated bent position into extended rectilinear position, thereby producing a very considerable closing stress for the die. The closed die is now ready to receive the material which is injected by means of the feeding cylinders or screws 7.

The opening of the die is effected in the opposite way.

The toggle joint lever pairs 19 of the illustrated embodiment are provided at their linkage points with link pins or bolts. It is however possible, according to the invention, to construct each toggle joint lever pair without pivots or bolts thereby eliminating all frictional resistances in said pivots or bolts, said resistances being in general responsible for the premature wearing due to the considerably large transmitted stresses.

Figure 6:
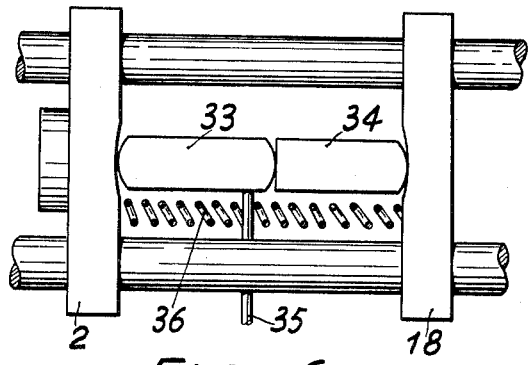
FIGS. 5 and 6 are views in opened and closed position respectively of a modification of the closing device in the machine of FIG. 1 and FIG. 2.
Figure 5:
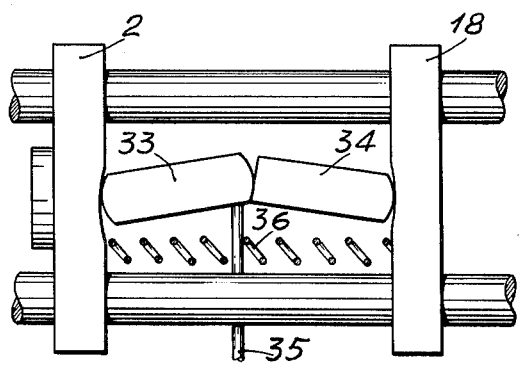
Figure 3:
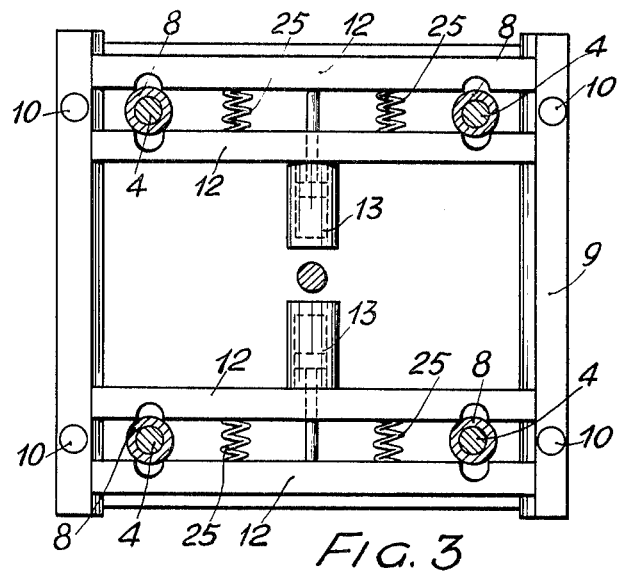
FIG. 3 is a section through the machine taken along the plane passing through C—C of FIG. 2.
Figure 4:
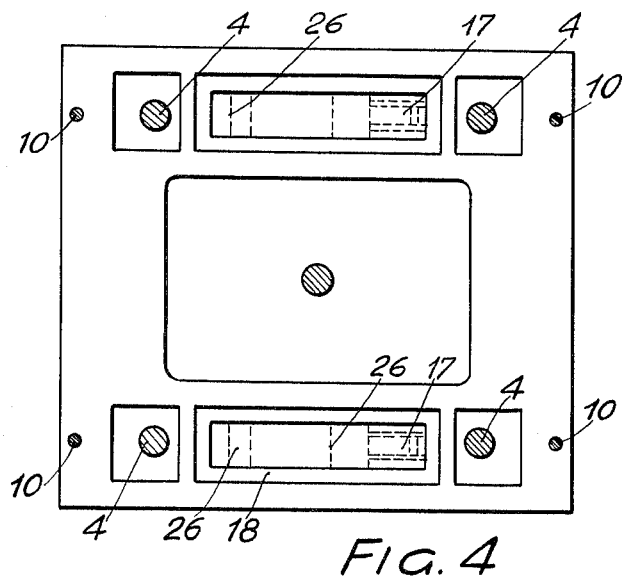
FIG. 4 is a section through D—D of FIG. 2.

This embodiment is shown in FIGURES 5 and 6. To this purpose the levers 33–34 (FIGS. 5 and 6) of each toggle joint lever pair have their ends formed with curved coupling surfaces. Said surfaces press against each other and against their seats in the movable die holder plate 2 and in the slide 18 without interposing of pivots or pins.

The levers 33 and 34 are kept under strong reciprocal pressure by means of a connection spring 36 connected with the two parts 2 and 18. A bar 35 forming a part of a cylinder-piston control unit 20 acts on the two levers to determine a toggle joint like movement of said two levers.

The curvature radii of the surfaces pressing against each other are of different amplitude. It is thereby possible to have said surfaces rolling on each other without any sliding friction but merely with rolling friction therebetween.

One of said contact surfaces may exhibit for instance an infinitely large radius while the other has a finite and well defined radius.

Since the frictional resistance is much smaller in the device of FIGS. 5 and 6 than in the pivot linked toggle joint levers of FIGS. 1 and 2 it results then the force required for the actuation of the first mentioned device of FIGS. 5 and 6 and therefore the power required by the corresponding driving members are considerably reduced.

It is possible to preventively compensate the plays by means of the compensating device 14–15–16 while using the device shown in FIGS. 5 and 6 for the closing of the dies. In this case the displacement of the angle portion of the levers 33 and 34 should be quite small, since it would be quite difficult to keep said levers together if the said displacement would be too large.

The invention is not limited by the illustrated embodiments. In particular, the structural form of the toggle joint levers shown in FIGS. 5 and 6 for the closing of the dies may be utilized even if there is provided no compensating device 14–16. The hydraulic control devices 13, 20 and 21 may be replaced by pneumatic, mechanical or electromagnetic devices. The compensating device 14–16 may consist, instead of wedges, of screws, eccentrics or similar mechanical elements acting as a wedge, i.e. having an enlarging or spreading apart action. The fixing in position of the movable die holder plate may also be effected in a different way. Finally it should be noted that the use of the device of the invention is not limited to injection or pressure fusion machines, but may be applied as well to any other machine comprising two parts which are to be strongly pressed against each other.

What is claimed is:

1. An injection molding machine comprising a stationary holder plate carrying one die half, a movable holder plate carrying the other die half, a large-stroke device for moving said movable holder plate toward said stationary holder plate to bring said die halves into abutment, means to prevent said movable holder plate from being displaced away from said stationary holder plate, a short-stroke device for further moving said movable holder plate toward said stationary holder plate to close said die halves together, and adjustable means associated with said short-stroke device to compensate for any play arising during use in said large-stroke device and said short-stroke device.

2. A machine according to claim 1, in which said adjustable means comprises a plurality of cooperating wedges, one of which is adjustably movable with respect to the others.

3. A machine according to claim 1, in which said movable holder plate comprises a front part and a back part relatively movable with respect to each other, and said adjustable means is positioned between said back part and said short-stroke device.

4. A machine according to claim 1, in which said short-stroke device comprises a toggle-lever mechanism.

5. A machine according to claim 4, which includes an adjustable stop for limiting the displacement of said toggle-lever mechanism in its bent position.

6. A machine according to claim 4, in which said toggle-lever mechanism is formed of a pair of levers having cooperating curved contact surfaces.

References Cited by the Examiner
UNITED STATES PATENTS
| | | | |
|---|---|---|---|
| 2,370,622 | 3/1945 | Gastrow | 18—30 |
| 2,498,264 | 2/1950 | Goldhard | 18—30 |

FOREIGN PATENTS
| | | |
|---|---|---|
| 124,664 | 6/1947 | Australia. |
| 513,756 | 10/1939 | Great Britain. |
| 786,248 | 11/1957 | Great Britain. |
| 884,352 | 12/1961 | Great Britain. |
| 888,184 | 1/1962 | Great Britain. |

J. SPENCER OVERHOLSER, *Primary Examiner.*

ROBERT F. WHITE, W. L. McBAY, *Examiners.*